United States Patent
Ying

(10) Patent No.: US 6,697,020 B2
(45) Date of Patent: Feb. 24, 2004

(54) PORTABLE COMMUNICATION APPARATUS HAVING A DISPLAY AND AN ANTENNA WITH A PLANE RADIATING MEMBER

(75) Inventor: Zhinong Ying, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/963,211

(22) Filed: Sep. 25, 2001

(65) Prior Publication Data

US 2002/0036593 A1 Mar. 28, 2002

(30) Foreign Application Priority Data

Sep. 25, 2000 (SE) .............................................. 0003426

(51) Int. Cl.[7] .............................. H01Q 1/38; H04B 1/18
(52) U.S. Cl. ............................. 343/702; 343/700 MS; 455/280
(58) Field of Search ..................... 343/702, 700 MS, 343/718, 830, 846; 455/280, 90, 228, 351; 340/825.44

(56) References Cited

U.S. PATENT DOCUMENTS

| 4,829,309 | A | | 5/1989 | Tsukamoto et al. |
| 5,007,105 | A | | 4/1991 | Kudoh et al. |
| 5,410,749 | A | | 4/1995 | Siwiak et al. |
| 5,627,548 | A | | 5/1997 | Woo et al. |
| 5,889,474 | A | | 3/1999 | LaDue |
| 6,346,919 | B1 | * | 2/2002 | Wang et al. ................. 343/767 |

FOREIGN PATENT DOCUMENTS

WO   97/44707 A2   11/1997

* cited by examiner

Primary Examiner—James Clinger
(74) Attorney, Agent, or Firm—Burns, Doane, Swecker & Mathis, L.L.P.

(57) ABSTRACT

A portable communication apparatus has a display and a first antenna with a plane radiating member. The display and the plane radiating member are integrated in a multi-layer structure, which is built into the portable communication apparatus. The first antenna may preferably be adapted for satellite communication, such as GPS.

17 Claims, 5 Drawing Sheets

PORTABLE COMMUNICATION APPARATUS HAVING A DISPLAY AND AN ANTENNA WITH A PLANE RADIATING MEMBER

This application claims priority under 35 U.S.C. §§119 and/or 365 to 0003426-4 filed in SWEDEN on Sep. 25, 2000; the entire content of which is hereby incorporated by reference.

TECHNICAL FIELD

The present invention relates to the field of radio communication and, in more particular, to a portable communication apparatus of the type having a display and at least one antenna.

PRIOR ART

Examples of a portable communication apparatus as set out above are a mobile telephone, a cordless telephone, a portable digital assistant, a communicator, a paging device, an electronic payment device, or a portable navigating device. Among these, the mobile or cellular telephone is currently believed to be the most prominent in terms of market penetration and sales volumes. Therefore, for the rest of this document, reference will be made to a mobile or cellular telephone for any commercially available mobile communications network, such as GSM, UMTS or D-AMPS. However, the invention is not limited to merely a mobile telephone. On the contrary, the invention is best defined by the appended independent patent claims.

Traditionally, older mobile telephones were only capable of normal speech communication between two users through a mobile communications network and, in many situations, a public switched telephone network. Historically, mobile telephones have often been provided with a monopole antenna mounted externally to the apparatus housing of the telephone. Rod antennas, whip antennas and helix antennas are some examples of such external monopole antennas.

However, as the size and weight of mobile telephones have continued to decrease, the above-described antennas have become less advantageous. Consequently, some contemporary mobile telephones are provided with built-in antennas in the form of a printed pattern of conductive material. Microstrip patch antennas and planar inverted F antennas (PIFA) are examples of such antennas. They are advantageous, compared to the above-described conventional antennas, in terms of small size and low weight. However, as mobile telephones become smaller and smaller, conventional microstrip patch antennas as well as conventional PIFA antennas are still too large to fit inside a miniaturized mobile telephone chassis. This is expected to be a problem particularly for new generations of mobile telephones, which will use multiple antennas for different purposes, such as cellular telecommunication, access to wireless LAN, satellite communication (GPS) and diversity.

Various approaches have been suggested in order to reduce the size of a built-in antenna. In WO 96/27219 a meandering inverted F antenna is proposed, which allows a reduction of the antenna size to about 40% of the size of a conventional PIFA antenna.

WO 00/03453 proposes a miniature printed spiral antenna adapted to be built into a mobile terminal. Antenna matching is achieved by a matching bridge positioned between a feeding pin and a grounded post. The size of this antenna is 20–30% of the size of a conventional PIFA antenna.

To summarize the above, a problem with modern mobile telephones and similar portable communication equipment is that the miniaturized apparatus size limits the surface area available for a built-in antenna. The problem is particularly pronounced for a mobile telephone with multiple antennas. Some future mobile telephones are believed to offer satellite navigation functionality (such as GPS) in addition to traditional cellular telecommunication and, possibly, wireless access to local area networks (LAN) as well as diversity functionality.

The problem of fitting a built-in GPS antenna in a miniaturized mobile telephone is accentuated by the fact that the GPS antenna needs some isolation from the cellular antenna. Moreover, GPS functionality requires a more directional antenna than a normal omni-directional cellular antenna. Additionally, since GPS operates at 1.57 GHz, the wavelength is about 21 cm. Therefore, a half-wave GPS antenna in open air will be about 10 cm in size.

SUMMARY OF THE INVENTION

The present invention seeks to remedy the problems set out above, when a miniaturized portable communication apparatus is to be provided with a built-in antenna, for which it is hard to find enough available surface area in the apparatus. More particularly, it is an object of the present invention to allow a miniaturized mobile telephone to include a fully operational GPS antenna, which will not interfere with the cellular antenna and which will not occupy any externally visible surface area of the mobile telephone.

The above objects have been achieved by an integrated display and antenna device having a multi-layer structure, where the display (preferably an LCD) is provided at an upper layer and a plane patch antenna element is attached behind the display as a lower layer. Preferably, the multi-layer structure will include a light-guiding layer adapted to illuminate the display layer, as well as a dielectric antenna substrate, upon which the patch antenna element is supported. The multi-layer structure will preferably also include an antenna feeding layer having a feeding pin, coupled to GPS radio circuitry in the mobile telephone, as well as a grounded matching post. Alternatively, the antenna feeding layer may comprise two feeding pins, which are connected in a one-to-two microstrip power divider configuration, so that the two feeding pins will have a phase difference of 90°, so as to obtain circular polarization.

Moreover, the dielectric substrate layer may comprise a dielectric framework in the form of a grid, wherein the dielectric constant may be varied depending on the material chosen for the dielectric framework as well as the grid density. This will allow the resonant frequency of the patch antenna element to be tuned to the appropriate frequency (e.g. the GPS frequency at 1.57 GHz).

These and other objects of the present invention will appear clearly from the following detailed disclosure of preferred and alternative embodiments, from the enclosed drawings as well as from the appended claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Preferred and alternative embodiments of the present invention will appear from the following detailed disclosure, reference being made to the accompanying drawings, in which FIG. 1 is a schematic front view of a portable communication apparatus according to the preferred embodiment, as well as the environment it is adapted to operate in.

DETAILED DISCLOSURE

Figure 1:
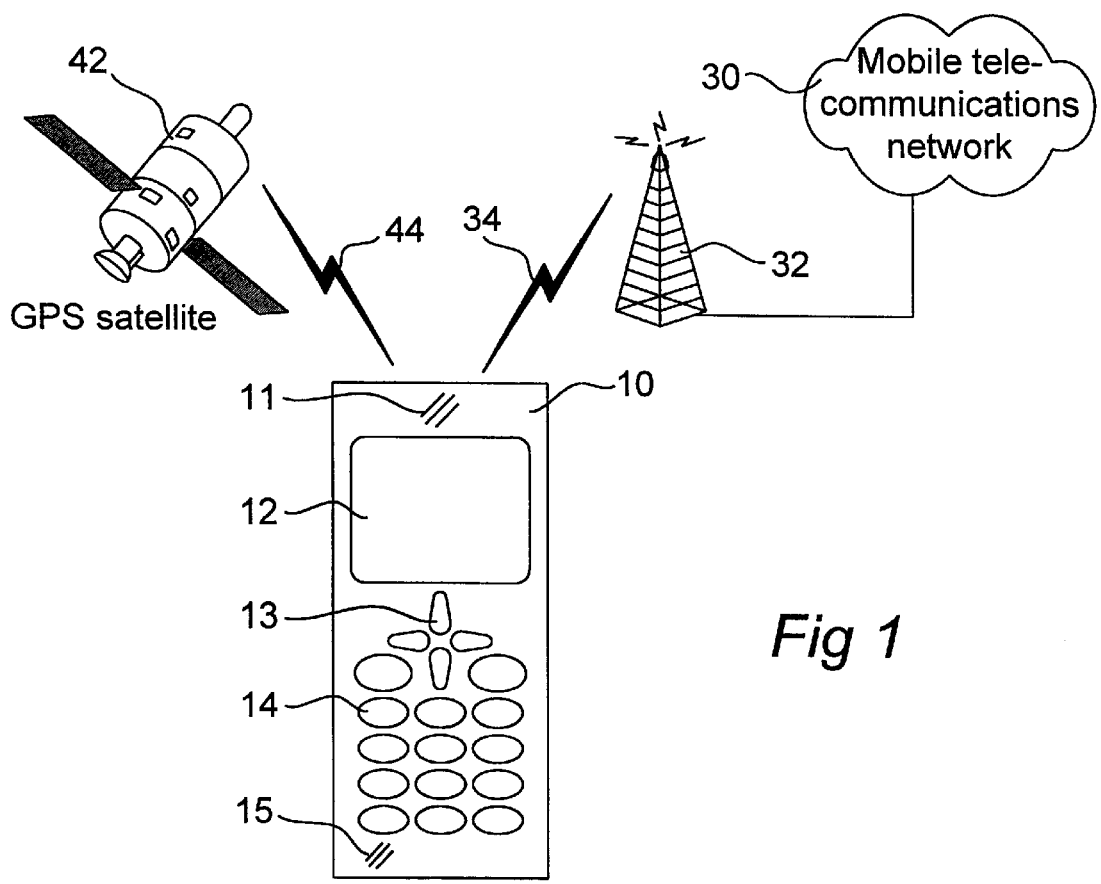
Figure 2:
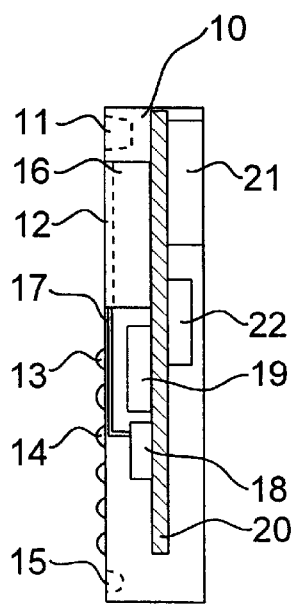
FIG. 2 is a schematic sectional side view of the portable communication apparatus shown in FIG. 1.

FIGS. 1 and 2 illustrate a mobile telephone 10 as seen from the front and the side, respectively. The main components of the mobile telephone 10 are further illustrated in a block diagram in FIG. 3. The mobile telephone 10 has no externally mounted antenna; instead the telephone has a built-in cellular antenna 21, which is mounted on a printed circuit board 20. A cellular radio transceiver 22 is also mounted on the printed circuit board 20 and is electrically connected to the cellular antenna 21 through appropriate conductive patterns or wiring on the printed circuit board 20. In a manner generally known per se, the mobile telephone 10 may establish a wireless link 34 to a radio station (base station) 32 in a mobile telecommunications network 30, such as GSM, UMTS or D-AMPS. The details of the cellular antenna 21 and the cellular radio transceiver 22 are not essential to the invention; they can be implemented by commercially available equipment depending on an actual application. For instance, the cellular antenna 21 may be a microstrip patch antenna, a PIFA antenna, a meandering microstrip antenna, etc. The cellular antenna 21 will be tuned to the or each frequency band that it is intended to operate in. For instance, if the mobile telecommunications network 30 is a GSM network, the cellular antenna 21 will be tuned for operation in the 900 MHz band and, optionally, the 1800 MHz DCS band and/or the 1900 MHz PCS band.

As seen in FIGS. 1 and 2, the mobile telephone 10 comprises a number of conventional components, such as a loudspeaker 11, a set of cursor keys 13, an alphanumeric keypad 14 and a microphone 15. These components are not believed to require any detailed description herein.

A display 12 is provided at the front portion of the mobile telephone 10 between the loudspeaker 11 and the cursor keys 13. For a user of the telephone, the display 12 appears to be a conventional display, which will present graphical information to the user as a part of a conventional man-machine interface. However, as seen in FIG. 2, the display 12 is in fact formed as an upper layer in a multi-layer structure 16, which is mounted to the printed circuit board 20 at an opposite side thereof compared to the cellular antenna 21 and the cellular radio transceiver 22. The display layer 12 is connected through wiring 17 to a display driver 18, which also is mounted to the printed circuit board 20. As will appear more clearly from the following description, the multi-layer structure 16 comprises not only the display 12 but also a satellite antenna for establishing a satellite link 44 to a GPS satellite 42.

The satellite antenna comprises a patch antenna element, which forms one layer in the multi-layer structure 16. The satellite antenna is connected to a satellite radio 19, which is mounted adjacently to the multi-layer structure 16 on the printed circuit board 20.

Consequently, the multi-layer structure 16 constitutes a combined display and satellite antenna device for the mobile telephone 10. The location of the cellular antenna 21 at the back of the mobile telephone 10 will allow this antenna to perform well, when the telephone is kept by the user in a traditional talking position. The integral GPS antenna is mounted behind the display at the front of the mobile telephone 10 and will consequently exhibit good performance, when the mobile telephone 10 is kept in a horizontal position and the display 12 faces upwards.

An advantage of the present invention is that the satellite antenna will be invisible from the outside thanks to the arrangement of the patch antenna element behind the display layer in the multi-layer structure 16.

Figure 3:
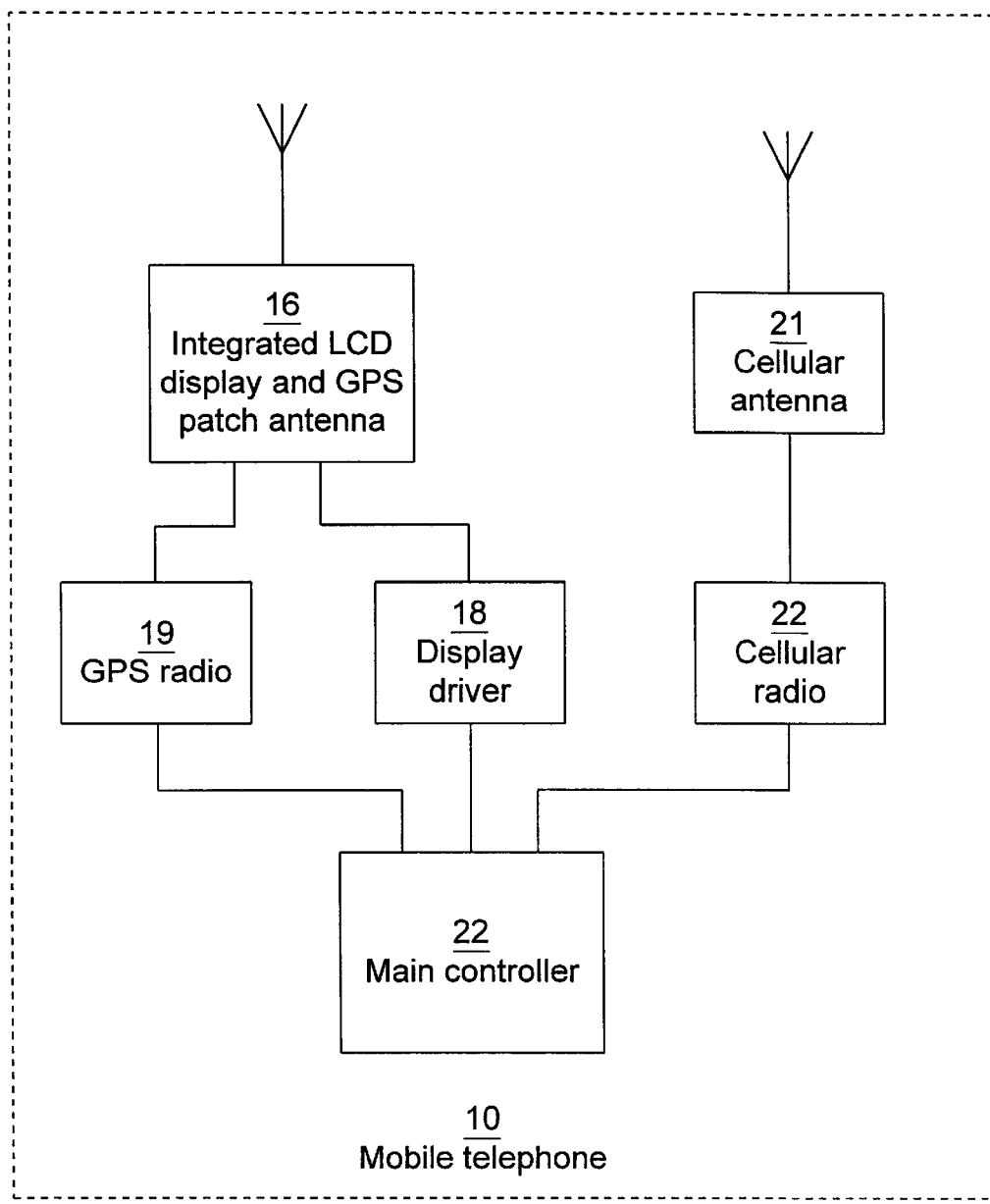
FIG. 3 is a schematic block diagram of the portable communication apparatus shown in FIGS. 1 and 2.

Before turning to the remaining figures, which will illustrate the combined display and satellite antenna device 16 in more detail, reference is made to FIG. 3, which illustrates the above on a general level. As seen in FIG. 3, the mobile telephone 10 comprises a main controller 22, which preferably is mounted on the printed circuit board 20. The main controller 22 may be implemented by any commercially available microprocessor or another type of programmable logic circuitry. The main controller 22 is operatively connected to the satellite radio 19, the display driver 18 and the cellular radio 22. As already mentioned, the satellite radio 19 is connected to the integrated display and satellite antenna 16. Moreover, the display driver 18 is also connected to the integrated display and satellite antenna 16 through aforesaid wiring 17. The cellular radio 22 is connected to the cellular antenna 21, as has already been mentioned above.

Figure 4:
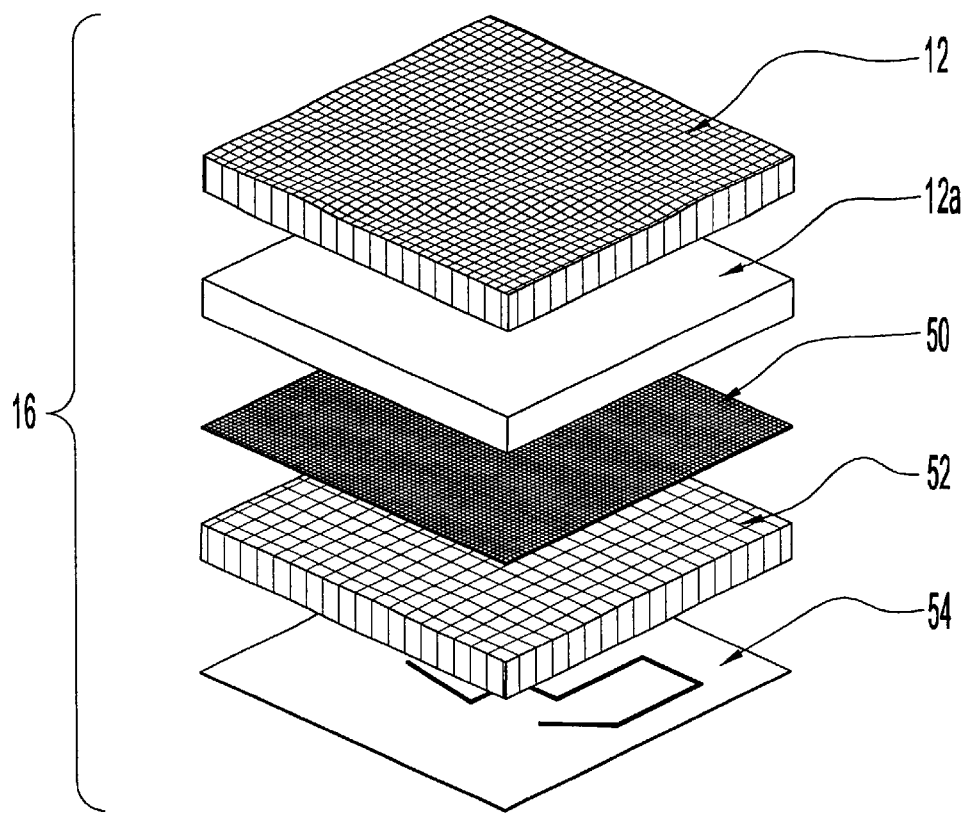
FIG. 4 is a schematic perspective sectional view of a combined display and antenna device in the portable communication apparatus of FIGS. 1–3.

A preferred embodiment of the integrated display and satellite antenna 16 will now be described with reference to FIGS. 4–6. As shown in FIG. 4, the combined display and satellite antenna is formed as a multi-layer structure 16 having a liquid crystal (LCD) layer 12 at its upper level. Hence, in the preferred embodiment the display 12 is formed by the uppermost layer of liquid crystals. A light-guiding layer 12a is positioned immediately under the display layer 12. The purpose of the light-guiding layer 12a is to provide illumination for the display 12. Preferably, the light-guiding layer 12a is made of a transparent material, such as plastic or glass. The light-guiding layer 12a is connected to a set of light-emitting diods (LED) or other sources of light, which are adapted to provide back illumination of the display 12 through the light-guiding layer 12a.

Next, in a third layer, there is provided a patch antenna element 50, which is made of a conductive material such as copper, silver or gold. The patch antenna element 50 is supported by a dielectric substrate layer 52, which is followed by an antenna feeding circuit layer 54.

Preferably, the size of the display 12 is equal to or less than the patch antenna element 50. The satellite patch antenna element 50 has a square shape in the preferred embodiment. The size of the shape may range from e.g. 3 cm to 10 cm depending on the dielectric properties of the underlying dielectric substrate layer 52. In a case where the dielectric substrate layer 52 has a dielectric constant $\epsilon_r$ essentially equal to 1, the size of the patch antenna element 50 will be about 10 cm in order to act as a half-wave antenna for GPS satellite communication in the 1.57 GHz frequency band.

Figure 5:
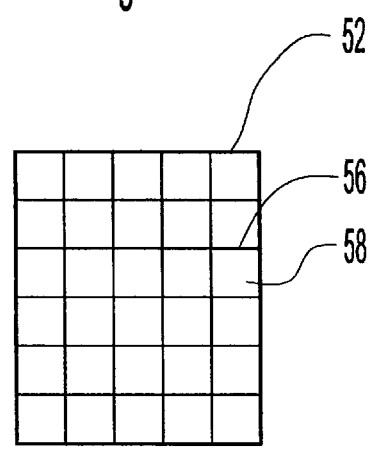
FIG. 5 illustrates a detail of the combined display and antenna shown in FIG. 4.

The dielectric substrate layer 52 is illustrated in more detail in FIG. 5. The layer 52 comprises a dielectric framework having the form of a grid. The grid 52 comprises a plurality of dielectric ribs 56, which extend in two orthogonal directions in parallel with the patch antenna element 50. The dielectric grid framework 52 may preferably be made of teflon, noryl or polystyrene. Preferably, the cubic volumes 58 formed between the ribs 56 will contain nothing but air. The equivalent dielectric constant $\epsilon_r$ of the entire dielectric substrate layer 52 may be varied by choosing different dielectric materials for the framework and also by varying the grid density, i.e. the distances between adjacent ribs 56. Consequently, it is possible to tune the resonant frequency of the patch antenna element 50 to occur within the desired frequency band, i.e. the GPS band at 1.57 GHz. Moreover, an equivalent dielectric constant $\epsilon_r > 1$ will allow a reduction of the patch antenna element to a size smaller than 10 cm, preferably 3–10 cm.

Figure 6:
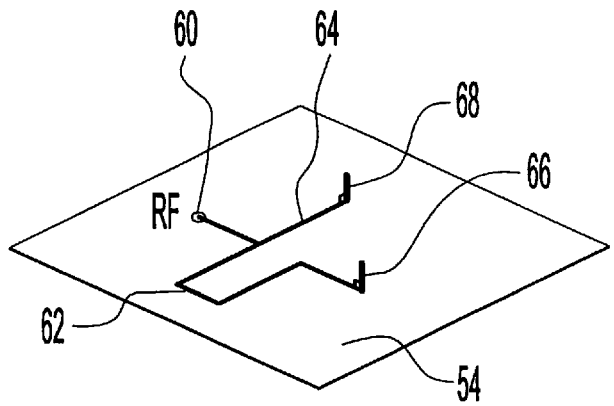
FIG. 6 shows another detail of FIG. 4.

The antenna feeding network layer 54 is illustrated in more detail in FIG. 6 and comprises a one-to-two micro-strip power divider having a first arm 62 and a second arm 64. The two arms 62 and 64 are jointly connected to an RF terminal 60, which is connected to the satellite radio 19. A first feeding pin 66 is connected to one end of the first arm 62 and protrudes in a vertical direction orthogonally to the layer 54 and the microstrip arm 62. Correspondingly, a second feeding pin 68 is provided at one end of the second microstrip arm 64. The feeding pins 66, 68 protrude through the dielectric substrate layer 52 (the dielectric framework grid) and are connected to the patch antenna element 50. The two feeding pins 66, 68 are adapted to supply respective satellite radio signals, which have a 90° phase difference that creates the circular polarization of the satellite patch antenna element 50.

Preferably, the antenna feeding network layer 54 is either mounted directly onto the surface of the printed circuit board 20, or does the layer 54 actually form a portion of the surface of the printed circuit board 20. The feeding pins 66, 68 may be implemented as metal pogo pins.

Figure 7:
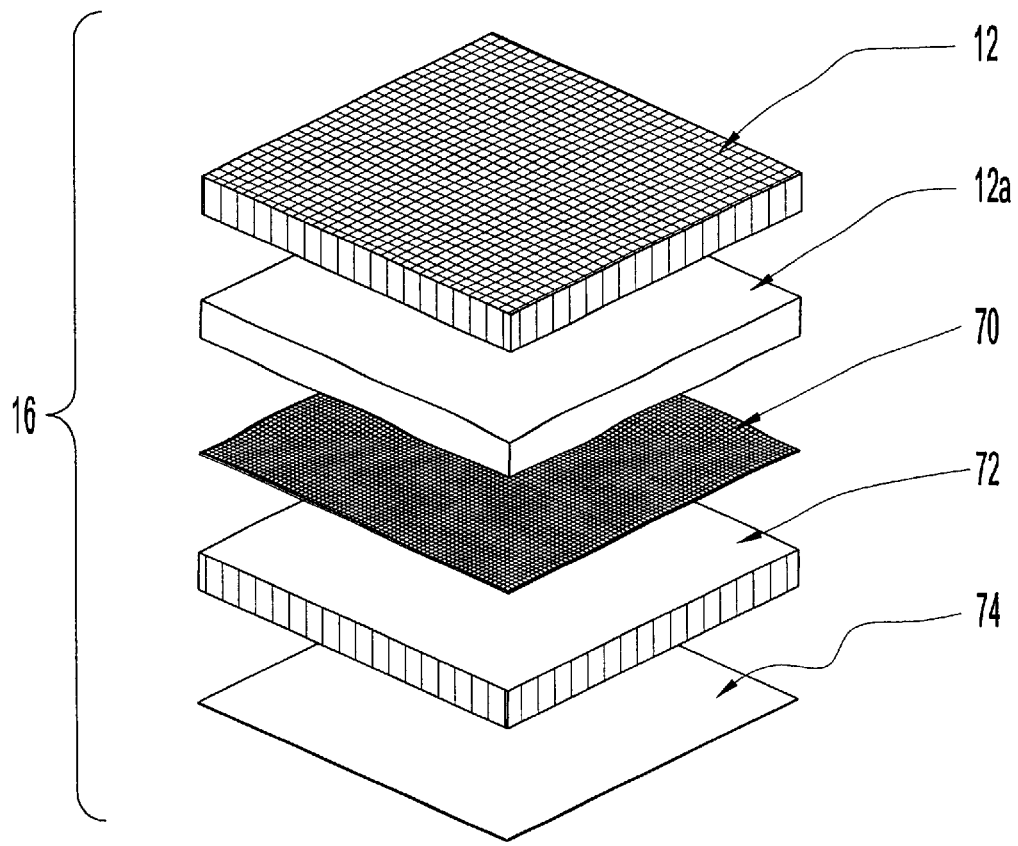
FIG. 7 is a schematic perspective sectional view of a combined display and antenna device according to an alternative embodiment.

An alternative embodiment of the invention will now be described with reference to FIGS. 7–9. As shown in FIG. 7, the combined display and satellite antenna is formed as a multi-layer structure 16 having a liquid crystal (LCD) layer 12 at its upper level, in similarity with the above-described preferred embodiment. A light-guiding layer 12a is positioned immediately under the display layer 12. As in the preferred embodiment, the purpose of the light-guiding layer 12a is to provide illumination for the display 12. Preferably, the light-guiding layer 12a is made of a transparent material, such as plastic or glass. The light-guiding layer 12a is connected to a set of light-emitting diods (LED) or other sources of light, which are adapted to provide back illumination of the display 12 through the light-guiding layer 12a.

A patch antenna element 70, which is made of a conductive material such as copper, silver or gold, is provided under the display 12 and light guide 12a. The patch antenna element 70 is supported on a dielectric substrate layer 72, which is followed by an antenna feeding layer 74.

Figure 8:
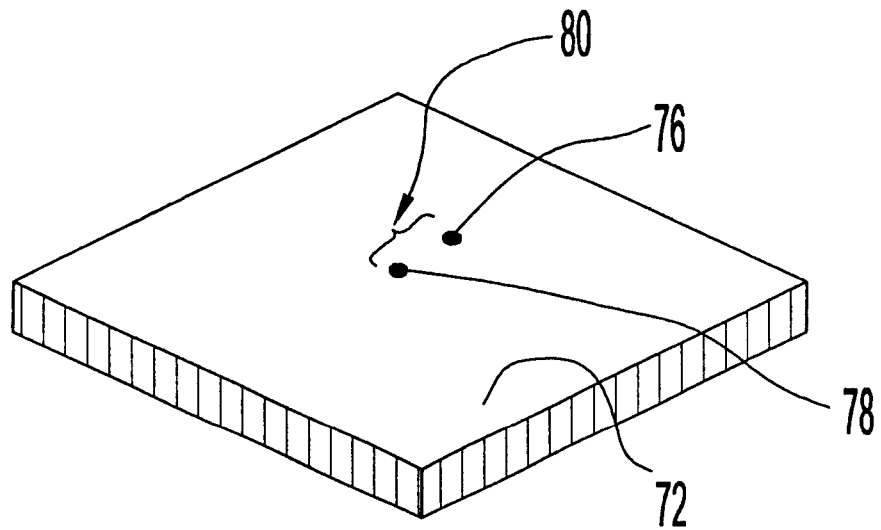
FIG. 8 illustrates a detail of the embodiment shown in FIG. 7.

The dielectric substrate layer 72 is illustrated in more detail in FIG. 8. The antenna feeding layer 74 is illustrated in more detail in FIG. 9.

Figure 9:
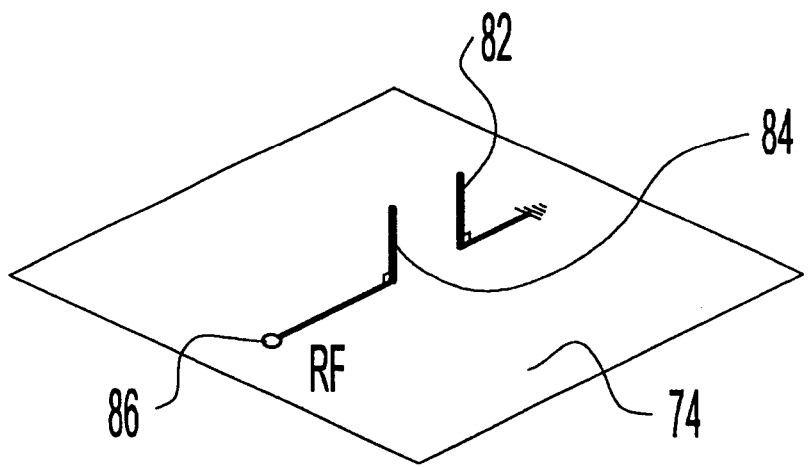
FIG. 9 illustrates another detail of the embodiment shown in FIG. 7.

As shown in FIG. 9, the antenna feeding layer 74 comprises a feeding pin 84, one end of which is connected to an RF terminal 86, which in turn is connected to the satellite radio 19. The antenna feeding layer 74 also comprises a matching post 82, which is grounded at one end, as shown in FIG. 9. The opposite ends of the feeding pin 84 and the matching post 82 (the upper ends as viewed in FIG. 9) protrude through the dielectric substrate 72 (as indicated by 78 and 76 in FIG. 8) and are connected to the patch antenna element 70. Preferably, the feeding pin 84, 78 and the matching post 82, 76 are implemented as metallized through-holes. Alternatively, they may be implemented as metal pogo pins. The resonant frequency of the patch antenna element 70 may be tuned by the distance 80 between the feeding pin 84, 78 and the matching post 82, 76, as indicated in FIG. 8. Advantageously, the plane in which the feeding pin and the matching post are arranged should be incident with the long side of the display and should moreover be perpendicular to the display driver 18, so as to minimize interference between the display driver and the patch antenna element. This is particularly advantageous in a case where the display driver 18 is not positioned at a distance from the display/antenna structure 16 (as is the case in FIG. 2) but is instead positioned in close proximity with the display 12 of the multi-layer structure 16.

The present invention has been described above with reference to some embodiments. However, other embodiments than the ones referred to above are equally possible within the scope of invention, which is best defined by the appended independent claims.

What is claimed is:

1. A portable communication apparatus comprising:

a display;

a dielectric substrate comprising a dielectric framework in the form of a grid; and a first antenna comprising a plane radiating member, wherein the display, the dielectric substrate, and the plane radiating member are integrated in a multi-layer structure.

2. A portable communication apparatus as in claim 1, wherein the plane radiating member is a patch antenna element.

3. A portable communication apparatus as in claim 1, wherein the display comprises a layer of liquid crystals.

4. A portable communication apparatus as in claim 1, further comprising a plane light-guiding member interposed between the display and the plane radiating member.

5. A portable communication apparatus as in claim 1, further comprising radio circuitry and an antenna feeding network having first and second microstrip arms, which are connected at a first respective end to the radio circuitry and at a second respective end to a respective feeding pin, wherein the feeding pins protrude through the dielectric substrate and are connected to the patch antenna element.

6. A portable communication apparatus as in claim 1, further comprising radio circuitry, a feeding pin, which at a first end is connected to the patch antenna element and at a second end is connected to the radio circuitry, and a matching post, which at a first end is connected to the patch antenna element and is grounded at a second end.

7. A portable communication apparatus as in claim 1, wherein the first antenna is adapted for satellite communication in a 1.57 GHz frequency band.

8. A portable communication apparatus as claim 1, further comprising a second antenna which is adapted to communicate with a mobile telecommunications network.

9. A portable communication apparatus as claim 1, wherein the apparatus is a mobile telephone.

10. A combined display and antenna device for a portable communication apparatus comprising:

a display having an extension in a first plane, a dielectric substrate comprising a dielectric framework in the form of a grid having an extension in a second plane; and a radiating member having an extension in a third plane, said first, second, and third planes being substantially parallel, wherein the radiating member and the dielectric substrate is integrated with said display in a multi-layer structure.

11. A combined display and antenna device as in claim 10, wherein the radiating member is a patch antenna element.

12. A combined display and antenna device as in claim 10, wherein the display comprises a layer of liquid crystals.

13. A combined display and antenna device as in claim 10, further comprising a plane light-guiding member interposed between the display and the radiating member.

14. A combined display and antenna device as in claim 10, further comprising radio circuitry and an antenna feeding network having first and second microstrip arms, which are connected at a first respective end to the radio circuitry and at a second respective end to a respective feeding pin, wherein the feeding pins protrude through the dielectric substrate and are connected to the patch antenna element.

15. A combined display and antenna device as in claim 10, further comprising radio circuitry, a feeding pin, which at a first end is connected to the patch antenna element and at a second end is connected to the radio circuitry, and a matching post, which at a first end is connected to the patch antenna element and is grounded at a second end.

16. A combined display and antenna device as in claim 10, wherein the radiating member is adapted for satellite communication in a 1.57 GHz frequency band.

17. A combined display and antenna device as in claim 10, wherein the device is positioned in a mobile telephone.

* * * * *